United States Patent [19]
Lambert et al.

[11] Patent Number: 5,557,296
[45] Date of Patent: Sep. 17, 1996

[54] FLAT-PANEL TYPE PICTURE DISPLAY DEVICE WITH INSULATING ELECTRON-PROPAGATION DUCTS

[75] Inventors: Nicolaas Lambert; Gerardus G. P. van Gorkom; Petrus H. F. Trompenaars; Siebe T. de Zwart, all of Eindhoven, Netherlands

[73] Assignee: U.S. Philips Corporation, New York, N.Y.

[21] Appl. No.: 60,330

[22] Filed: May 11, 1993

Related U.S. Application Data

[63] Continuation-in-part of Ser. No. 830,951, Feb. 6, 1992, Pat. No. 5,313,136, Ser. No. 223,962, Jul. 17, 1992, Pat. No. 5,497,046, and Ser. No. 53,980, Apr. 26, 1993, Pat. No. 5,347,199, which is a continuation of Ser. No. 954,949, Sep. 30, 1992, abandoned, which is a continuation of Ser. No. 637,039, Jan. 3, 1991, abandoned, which is a continuation of Ser. No. 528,677, May 24, 1990, abandoned, said Ser. No. 830,951, is a continuation of Ser. No. 528,677, said Ser. No. 223,962, is a continuation of Ser. No. 715,072, Jun. 13, 1991, abandoned.

[30] Foreign Application Priority Data

| Jun. 1, 1989 | [NL] | Netherlands | 8901391 |
| May 7, 1990 | [NL] | Netherlands | 9001528 |
| Jun. 5, 1990 | [NL] | Netherlands | 9001266 |
| Oct. 10, 1990 | [NL] | Netherlands | 9000060 |
| Nov. 26, 1990 | [NL] | Netherlands | 9002566 |
| Jun. 12, 1992 | [EP] | European Pat. Off. | 92201720 |

[51] Int. Cl.[6] .............................. G09G 3/22; H01J 31/12
[52] U.S. Cl. .................................. 345/74; 313/422
[58] Field of Search .......................... 345/47, 74, 75; 348/796; 313/422, 426, 460

[56] References Cited

U.S. PATENT DOCUMENTS

| 4,956,575 | 9/1990 | Chang | 313/422 |
| 4,965,487 | 10/1990 | Freeman | 313/422 |
| 4,980,613 | 12/1990 | Miyama et al. | 313/422 |
| 5,270,611 | 12/1993 | Van Gorkom | 313/422 |
| 5,386,175 | 1/1995 | Van Gorkom et al. | 313/422 |
| 5,442,253 | 8/1995 | Van Gorkom et al. | 313/422 |

FOREIGN PATENT DOCUMENTS

| 0369468 | 5/1990 | European Pat. Off. |
| 0400750 | 12/1990 | European Pat. Off. |
| 0436997 | 7/1991 | European Pat. Off. |
| 0464937 | 1/1992 | European Pat. Off. |

*Primary Examiner*—Jeffery Brier
*Attorney, Agent, or Firm*—Robert J. Kraus

[57] ABSTRACT

Flat-panel type picture display device having a luminescent screen and a large number of electron propagation ducts operating by means of electron wall interaction. At a given resolution, hexagonal phosphor dot patterns in which dots are horizontally staggered generally produce fewer artefacts than in a 90° tilted orientation. An addressing system for withdrawing electrons from the propagation ducts and for directing them towards the luminescent screen is preferably formed as a multistepped structure with a preselection structure of rows of preselection electrodes and a fine-selection structure of rows of fine-selection electrodes. To interconnect the fine-selection electrodes in parallel in a minimal number of groups, it is advantageous when the fine-selection electrodes are arranged parallel to the preselection electrodes.

24 Claims, 8 Drawing Sheets

FLAT-PANEL TYPE PICTURE DISPLAY DEVICE WITH INSULATING ELECTRON-PROPAGATION DUCTS

CROSS REFERENCE TO RELATED APPLICATIONS

This application is a continuation-in-part of patent application Ser. No. 07/830,951 filed on 6 Feb. 1992 (now U.S. Pat. No. 5,313,136 issued on 17 May 1994), which is a continuation of U.S. patent application Ser. No. 07/528,677 filed on 24 May 1990, now abandoned; and is a continuation in part of allowed U.S. patent application Ser. No. 08/053,980 filed on 26 Apr. 1993, now U.S. Pat. No. 5,347,199, which is a continuation of U.S. patent application Ser. No. 07/954,949 filed on 30 Sep. 1992, now abandoned, which is a continuation of U.S. patent application Ser. No. 07/637,039 filed on 3 Jan. 1991, now abandoned, which is a continuation of U.S. patent application Ser. No. 07/528,677 filed on 24 May 1990, now abandoned; and is a continuation-in-part of allowed U.S. patent application Ser. No. 08/223,962 filed on 17 Jul. 1992, now U.S. Pat. No. 5,497.046, which is a continuation of U.S. patent application Ser. No. 07/715,072 filed on 13 Jun. 1991, now abandoned.

BACKGROUND OF THE INVENTION

The invention relates to a picture display device having a vacuum envelope which is provided with a transparent face plate with a display screen having a pattern of picture elements (pixels) luminescing in different colours, and with a rear plate. The display device comprises a plurality of juxtaposed electron propagation means extending substantially parallel to the face plate, and an addressing system, arranged between the electron propagation means and the face plate, to selectively address desired pixels on the screen.

The display device described above is of the flat-panel type, as disclosed in EP-A-464 937. Display devices of the flat-panel type are devices having a transparent face plate and, arranged at a small distance therefrom, a rear plate, with the inner surface of the face plate being provided with a (hexagonal) pattern of phosphor dots. If (video information-controlled) electrons impinge upon the luminescent screen, a visual image is formed which is visible via the front side of the face plate. The face plate may be flat or, if desired, curved (for example, spherical or cylindrical).

The display device described in EP-A-464 937 comprises a plurality of juxtaposed sources for emitting electrons, local electron-propagation means cooperating with the sources and each having walls of high-ohmic, substantially electrically insulating material having a secondary emission coefficient suitable for propagating emitted electrons, and an addressing system with electrodes (selection electrodes) which can be driven row by row for withdrawing electrons from the propagation means at predetermined extraction locations facing the luminescent screen, further means being provided for directing extracted electrons towards pixels of the luminescent screen for producing a picture composed of pixels.

The operation of the picture display device disclosed in EP-A-464 937 is based on the recognition that electron propagation is possible when electrons impinge on a wall of a high-ohmic, substantially electrically insulating material (for example, glass or synthetic material) if an electric field of sufficient power is generated over a given length of the wall (by applying a potential difference across the ends of the wall). The impinging electrons then generate secondary electrons by wall interaction, which electrons are attracted to a further wall section and in their turn generate secondary electrons again by wall interaction, and so forth.

Starting from the above-mentioned principle, a flat-panel picture display device can be realised by providing each one of a plurality of juxtaposed "compartments", which constitute propagation ducts, with a column of extraction apertures at a side which is to face a display screen. It will then be practical to arrange the extraction apertures along "horizontal" lines extending transversely to the ducts. By adding selection electrodes arranged in rows to the arrangement of apertures, an addressing means is provided with which electrons can be selectively withdrawn from the "compartments" and directed (and accelerated) towards the screen for producing a picture composed of pixels by activating the pixels.

The addressing system can be of the single-stage type, or of the multi-stage type. EP-A-464 937 particularly describes a multi-stage addressing system. A multi-stage addressing system using a number of preselection extraction locations, which number is reduced with respect to the number of pixels, and associated therewith a number of (fine-) selection apertures, which corresponds to the number of pixels, provides advantages with respect to the extraction efficiency and/or with respect to the required number of connections/drivers. For controlling the preselection locations a pattern of preselection electrodes is used, and for controlling the (fine) selection apertures a pattern of fine-selection electrodes is used.

In the traditional display tubes the pitch of the shadow mask is typically 2 to 3 times smaller than the spot size. The resolution, i.e. definition of the display is then determined by the spot size, while the precise details of the colour dots within a shadow mask pitch are less important. In displays having discretely addressed colour dots the pitch of the colour dot structure is of the same order as the resolution of the display. Since a too high resolution of the display is expensive, when using a given signal, it is important to choose the resolution of the display in the vicinity of the desired resolution. Hence, the details of colour dot structure are more important than in the tradition display tube.

SUMMARY OF THE INVENTION

It is an object of the invention to provide a display device of the type described in the opening paragraph having an arrangement of pixels which, particularly for conventional TV signals (horizontal lines, interlace), enables a suitable combination of desired resolution on the one hand and artefacts which are not too much visible on the other hand. Preferably, the pixel arrangement is simple in itself and, in the case of a multi-stage addressing system, allows the use of a simple fine-selection electrode arrangement.

This object is achieved in that the pixels are arranged along paths extending transversely to the electron propagation means, the pixels of adjoining paths being staggered with respect to each other. (In a large number of applications this implies that the pixels are arranged in (horizontal) paths parallel to the long axis of the display screen.)

The invention is based on the following recognitions.

Experiments in the field of optimum dot structures have shown that a "delta" arrangement (in a hexagonal pattern) of the colour dots is generally the best structure to the viewer. In practice a distinction should be made between two orientations, viz those in which the dots are arranged along "vertical" lines and are vertically staggered and those in which they are arranged along "horizontal" lines and are horizontally staggered (dot triplets in delta, or traffic sign, configuration). These orientations show differences in artefacts, which differences are dependent, inter alia on the drive mode. For the conventional TV signals (horizontal lines, interlace) the horizontally staggered dot configuration appears to provide the best possibility to achieve a suitable combination of desired resolution and artefacts which are not too much visible. Each picture line is then written, for example across two horizontal R,G,B color dot paths (which together form a row of adjoining dot triangles). The drive scheme is such that consecutive (interlace) lines move up by only one colour dot (half a triangle) a time and thus overlap each other by half a line. In a display with vertical dot paths such an overlap may cause (colour) artefacts at sharp, vertical contrast transitions which give rise to a colour flicker in the case of interlace. To avoid this, overlap should be prevented, which is only possible if a screen with a larger number of (smaller) dots is used.

An embodiment of the display device according to the invention is characterized in that the addressing system comprises a preselection structure having preselection locations which are connected by preselection (or coarse-selection) electrodes parallel to the paths, and a fine-selection structure having fine-selection apertures which are connected by fine-selection electrodes, each fine-selection aperture being associated with a pixel and the orientation of the fine-selection electrodes corresponding to the orientation of the preselection electrodes.

When a multi-stage addressing system, e.g. the above double stage system, is used, it is possible to interconnect corresponding fine-selection electrodes in a number of groups. In this way the required number of connections/driver circuits can be reduced. The electrode tracks which connect the fine selection apertures (which tracks define the orientation of the fine selection electrodes) may have different orientations, for example "vertical" or "oblique" orientations. The invention is based, among other things, on the recognition that an optimal reduction of the number of groups of fine-selection electrodes is only possible if the electrode tracks which connect the fine selection apertures have the same orientation as the electrode tracks of the pre-selection selection structure.

In the case that "vertical" R,G,B colour dot paths would be utilized, it is relatively simple to suitably connect the color dots by horizontal fine-selection tracks. The dots of one colour are then arranged along horizontal lines and may be simply interconnected. In the above-mentioned arrangement of colour dots it is, however, more difficult to define a suitable pattern of horizontally oriented fine-selection tracks. It is only possible to horizontally interconnect dots of the same colour in the case of a very fine track pattern, which leads to small insulation distances, which is not practical. Yet it is possible to define a practical horizontal track pattern if the requirement of interconnecting only apertures for addressing dots of the same colour is not imposed. It is only essential for the operation of the display that the fine-selection apertures associated with each fine-selection location are driven separately. This leads to a number of novel variants of track patterns in combination with a repetitive pattern of "horizontally" arranged phosphor dots of different colours.

Systems with four or six fine-selection apertures per coarse-selection aperture are then possible, but the addressing mechanism then does not operate as satisfactorily, which renders such systems less attractive.

Systems having two or three fine-selection apertures per coarse-selection aperture are preferred in this respect, while selection in groups of two has the advantage of a simple implementation and selection in groups of three has the advantage of a smaller number of coarse-selection connections.

A large reduction of the number of connections can be achieved by parallel interconnection of fine-selection tracks in groups. For colour display it is necessary that the fine-selection electrode at each addressed coarse-selection aperture has a considerably higher potential at the desired colour than the other fine-selection electrodes associated with the coarse-selection aperture.

In order to prevent electrons in the stepped twofold, threefold or multifold selection system from passing straight from the preselection structure, or even from the rear wall through (unaddressed) apertures in the fine-selection plate towards the luminescent screen (i.e. without anywhere hitting walls or the front side of the selection plate: referred to as direct hits) an apertured plate is arranged, in accordance with an embodiment of the invention, between the preselection structure and the selection plate. The aperture sizes and the distance to the selection plate are chosen in such a way that direct hits are substantially impossible (the plate being referred to as anti-direct hit plate).

BRIEF DESCRIPTION OF THE DRAWINGS

These and other aspects of the invention will be described in greater detail with reference to the embodiments described hereinafter, using identical reference numerals for the same components.

DESCRIPTION OF THE PREFERRED EMBODIMENTS

Figures 1, 1A:
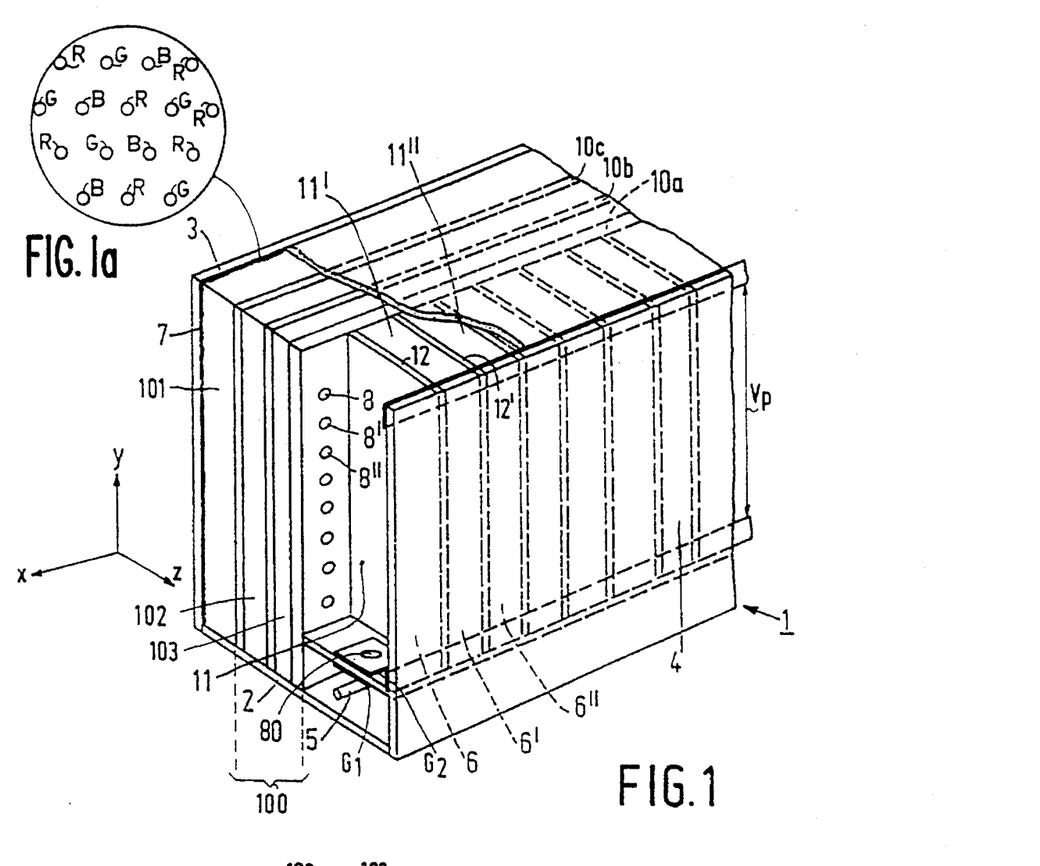
FIG. 1 is a diagrammatic perspective elevational view, partly broken away, of a part of a (colour) display device with electron propagation ducts and an active colour selection structure comprising an apertured preselection plate and an apertured fine-selection plate whose components are not shown to scale.
FIG. 1a shows a detail of FIG. 1.

FIG. 1 shows a flat-panel picture display device having a display panel (window) 3 and a rear wall 4 located opposite the panel. Display screen 7 has a hexagonal pattern of red (R), green (G) and blue (B) luminescing phosphor elements arranged in triangles (traffic sign configurations) located on the inner surface of window 3. According to the invention the red, green and blue phosphor elements are arranged, in staggered relationship, in paths parallel to the long axis of the display screen (in other words, they are horizontally staggered, see inset).

An electron source arrangement 5, for example a line cathode which by means of electrodes provides a large number, for example 600, of electron emitters or a corresponding number of separate emitters, is arranged proximate to a wall 2 which interconnects panel 3 and rear wall 4. Each of these emitters is to provide a relatively small current so that many types of cathodes (cold or hot cathodes) are suitable as emitters. The emitters may be driven by a video drive circuit. The electron source arrangement 5 is arranged opposite entrance apertures of a row of electron propagation ducts extending substantially parallel to the screen, which ducts are constituted by compartments 6, 6', 6'', . . . etc.; in this case one compartment for each electron source. These compartments have cavities 11, 11', 11'', . . . defined by the rear wall 4 and partitions 12, 12', . . . . The cavities 11, 11', . . . may alternatively be provided in the rear wall 4 itself. At least one wall (preferably the rear wall) of each compartment should have a high electrical resistance which is suitable for the purpose of the invention in at least the propagation direction (suitable materials are, for example ceramic material, glass, synthetic material - coated or uncoated -) and have a secondary emission coefficient δ>1 over a given range of primary electron energies. An axial propagation field is generated in the compartments by applying a potential difference $V_p$ across the height of the compartments 6, 6', 6'', . . . .

The electrical resistance of the wall material has such a value that a minimum possible total amount of current (preferably less than, for example 10 mA) will flow in the walls in the case of a field strength in the axial direction in the compartments on the order of one hundred to several hundred volts per cm. required for the electron propagation. By applying a voltage on the order of several tens of volts to several hundred volts (value of the voltage is dependent on circumstances) between the row 5 of electron sources and the compartments 6, 6', 6'', electrons are accelerated from the electron sources towards the compartments, whereafter they impinge upon the walls in the compartments and generate secondary electrons.

The invention utilizes the aspect disclosed in EP-A-400 750 corresponding to U.S. Pat. No. 5,313,136; and EP-A-436 997 corresponding to U.S. Pat. No. 5,347,199. That vacuum electron propagation within compartments having walls of high-ohmic substantially electrically insulating material is possible if an electric field of sufficient power is applied in the longitudinal direction of the compartment. The contents of EP-A-400 750 and EP-A-436 997 are herein incorporated by reference.

Figure 2:
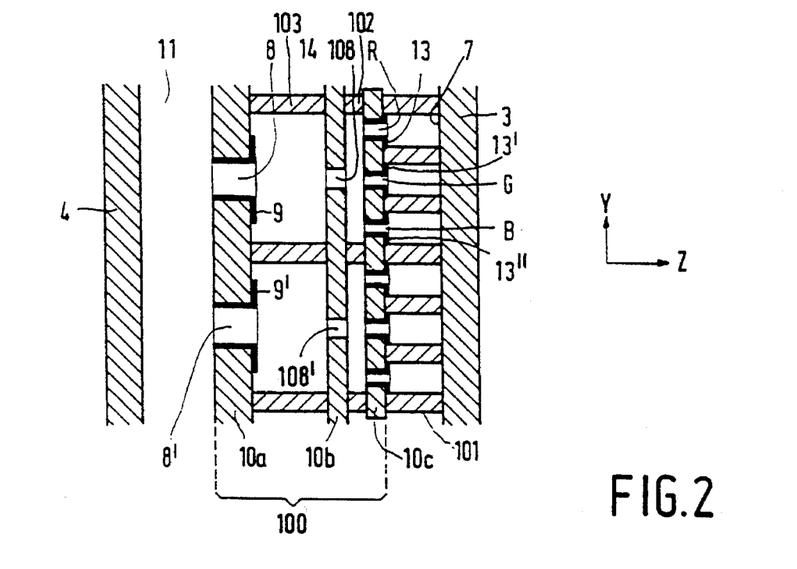
FIG. 2 is a cross-section through a part of a device of the type of FIG. 1.

The space between the compartments and the luminescent screen 7, which is arranged on the inner wall of panel 3, accommodates an active colour selection system 100 which comprises an (active) preselection structure (in this case) having a preselection plate 10a, a (passive) anti-direct-hit plate 10b and an (active) (fine)selection plate 10c (see also FIG. 2). Structure 100 is separated from the luminescent screen 7 by a flu-spacer structure 101, for example an apertured plate of electrically insulating material.

Figure 3:
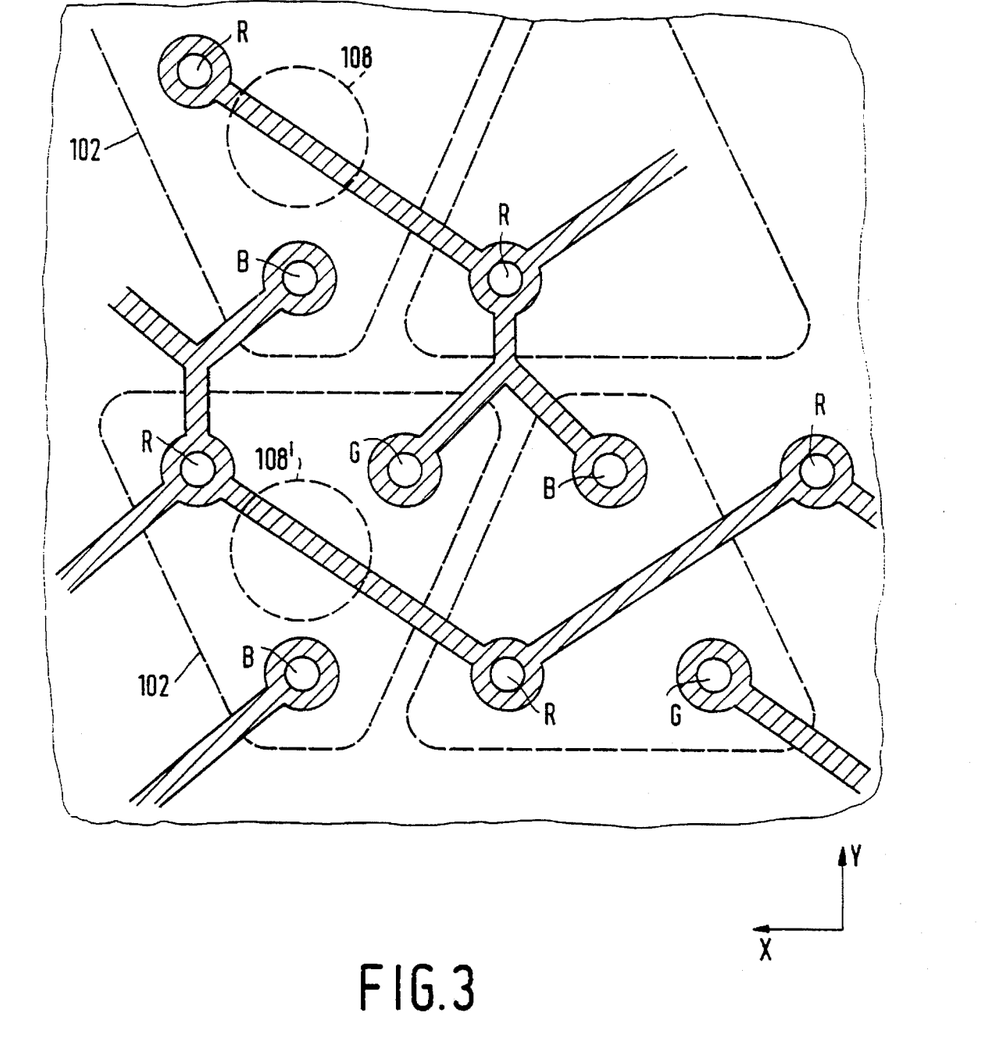
FIG. 3 illustrates the operation of the active colour selection structure.

FIG. 2 shows in a diagrammatical cross-section a pan of the display device of FIG. 1 in greater detail, particularly the active colour selection plate structure 100 which comprises a preselection plate 10a with apertures 8, 8', 8'', . . . and a fine-selection plate 10b with groups of apertures R, G, B. In this case three fine-selection apertures R, G, B are associated with each preselection aperture 8, 8', etc. In the diagrammatic FIG. 2 the apertures R, G, B are shown as being in-line. However, in a practical embodiment they are arranged in a triangular configuration, see, for example FIG. 3. An anti-direct-hit plate 10b having apertures 108, 108', . . ., constituting, as it were, "chicanes" in the electron paths is arranged between the preselection plate 10a and the fine-selection plate 10c.

Electron propagation ducts 6 with propagation cavities 11, 11', . . . are formed between the structure 100 and rear wall 4. To be able to draw electrons from the ducts 6 via the apertures 8, 8', . . ., addressable metal preselection electrodes 9, 9', etc. extending from aperture to aperture and surrounding the apertures are arranged in ("horizontal") rows parallel to the long axis of the display screen on the plate 10a.

The walls of the apertures 8, 8', . . . may be metallized to enhance the effect of the electrodes.

Similarly as the plate 10a, the fine-selection plate 10c is provided with "horizontally oriented" addressable rows of (fine-) selection electrodes for realising fine selection. The possibility of directly or capacitively interconnecting corresponding rows of fine-selection electrodes is important in this respect. In fact, a preselection has already taken place and, in principle, electrons cannot land at the wrong location. This means that only one group, or a small number of groups of three separately formed fine-selection electrodes is required for this mode of fine selection.

Figure 14:
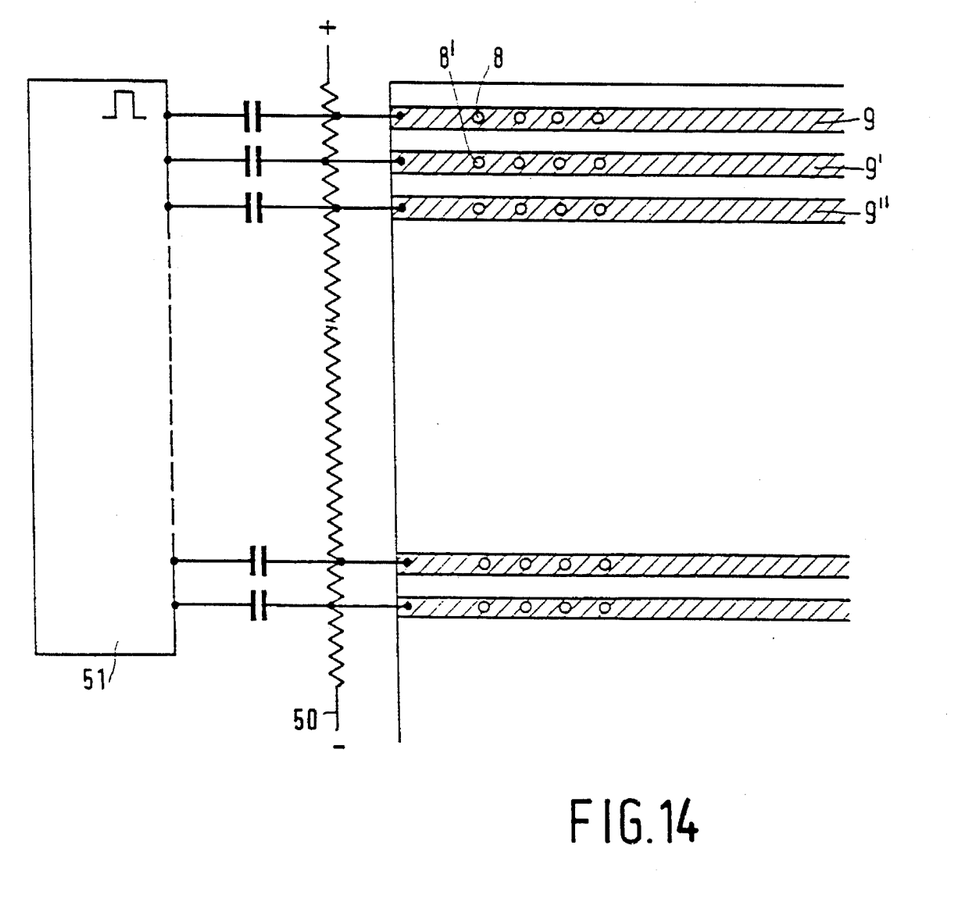
FIG. 14 shows diagrammatically a circuit for driving preselection electrodes.

The rows of preselection electrodes are subjected to a linearly increasing DC voltage by connecting them to voltage-dividing resistors 50 (see FIG. 14). These voltage-dividing resistors may be arranged at the rim of the preselection plate, in vacuo. The voltage-dividing resistors are connected to a voltage source in such a way that the preselection electrodes receive the correct potential to realise electron propagation in the ducts. The drive is effected from a drive circuit 51, for example, by applying a pulse (of, for example, 250 V) for a short time to consecutive preselection electrodes and by applying shorter lasting pulses of, for example, 200 V to the desired fine-selection electrodes. It should of course be ensured that the line selection pulses are in synchronism with the video information. The video information is presented, for example to the individual $G_1$ electrodes driving the emitters (FIG. 1), for example in the form of a time or amplitude-modulated signal.

It is to be noted that various modifications of the structure with the anti-direct hit plate 10b as shown in FIG. 2 are possible. For example, the plate 10b may be combined with spacer plates 102, 103 to form a single assembly.

Figure 4:
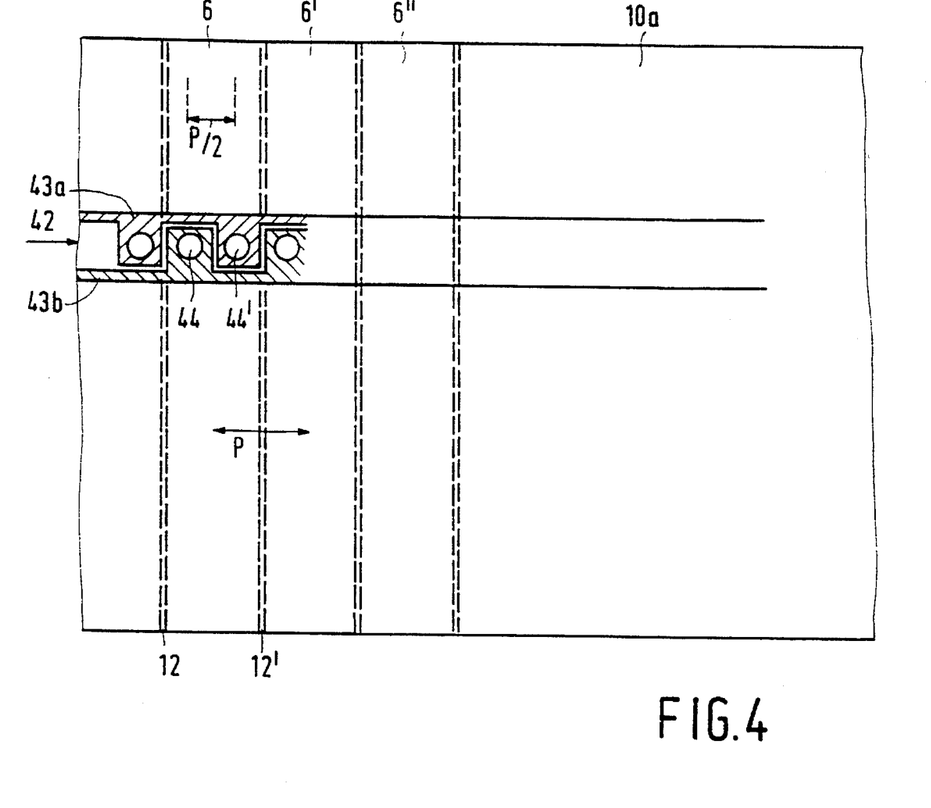
FIG. 4 is an elevational view of an embodiment of a preselection plate.

FIG. 4 shows an embodiment of a pre-selection plate 10a in which two preselection apertures for each extraction location with a pitch of (p/2) are provided in each (horizontal) row of preselection electrodes. Each preselection electrode 42 is divided into two apertured sub-electrodes 43a and 43b in the manner shown, which simplifies contacting. In this way the horizontal resolution can be doubled, while, for example the width of the propagation ducts, which are localized between walls 12 and 12', remains the same and without having to change the mode of operating the propagation ducts 6, 6', 6'', . . . (each cooperating with one electron emitter). A plurality of fine-selection apertures is associated with each preselection aperture (44, 44', . . .), for example, in the manner shown in FIG. 1. The system described can be operated in the "multiplex" mode. This means that, for example 2×3 pixels can be consecutively driven (multiplexed) in one line period by means of one electron emitter. Other multiplex schemes are alternatively possible.

An alternative possibility is to make the propagation duct width twice as large while the horizontal pixel pitch remains the same. Its advantages are:

the propagation voltage is a factor of 2 lower, the number of cathodes (or $G_1$ sections), is also twice as small.

As mentioned above a plurality of fine-selection apertures is associated with each preselection (or coarse-)selection aperture. To reduce the number of (coarse-selection) connections, it is attractive to drive a maximum possible number of fine-selection apertures per coarse-selection aperture, but it will be evident that this operation will be more difficult as the number of apertures increases. Moreover, a large symmetry between the apertures enhances the uniform operation of the system. Experiments have proved that a satisfactory operation is found when either 2 or 3 fine-selection apertures are associated with each coarse-selection aperture.

Selection of the type 2:1

Figure 5:
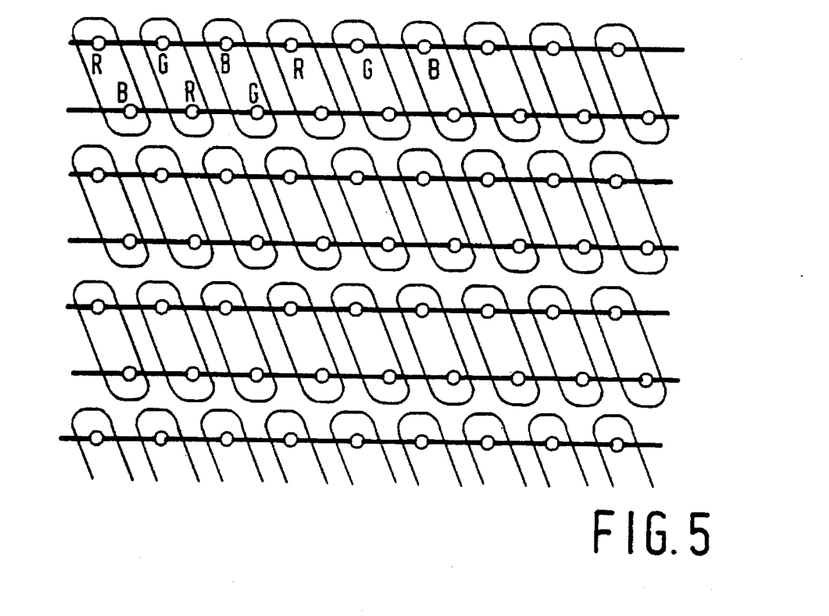
FIG. 5 to 13 show different geometries of fine-selection apertures and fine-selection electrodes.
Figure 6:
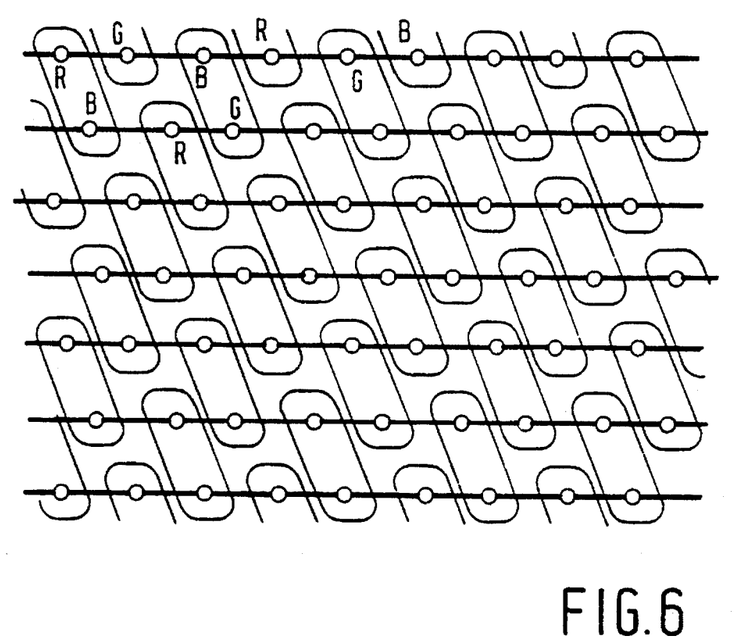
Figure 7:
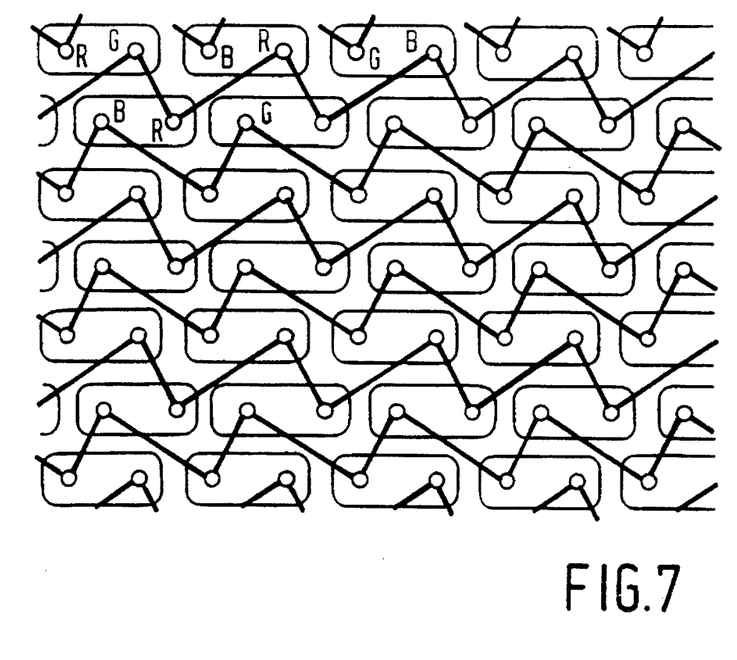

For a system having two fine-selection apertures per coarse-selection aperture, the concept of having the selection tracks interconnect different colours directly leads to usable solutions. For vertical or oblique groups of two fine-selection apertures associated with one preselection location, the fine-selection apertures can be directly interconnected horizontally by the fine-selection electrode tracks, see FIGS. 5 and 6. For horizontal groups of two horizontal connections can be realised in all kinds of manners by means of tracks which zig-zag between two dot paths, see, for example FIG. 7.

Selection of the type 3:1

Figure 8:
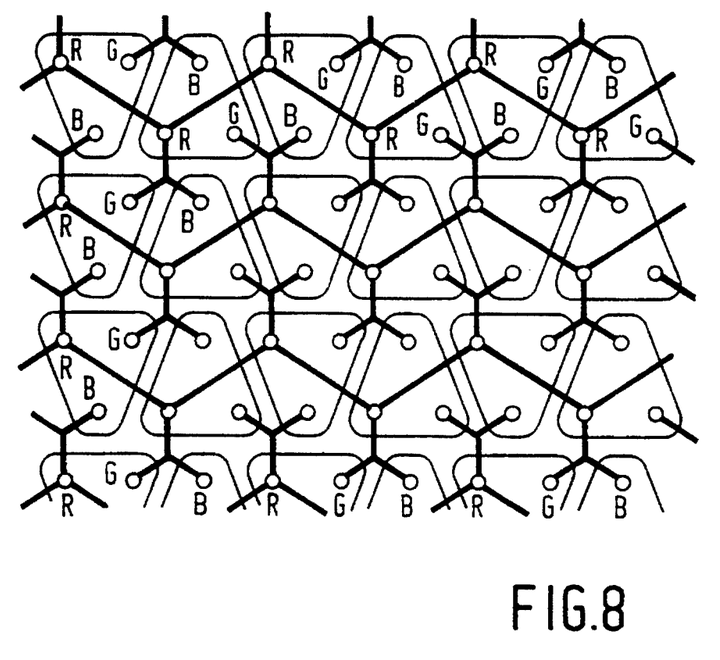
Figure 9:
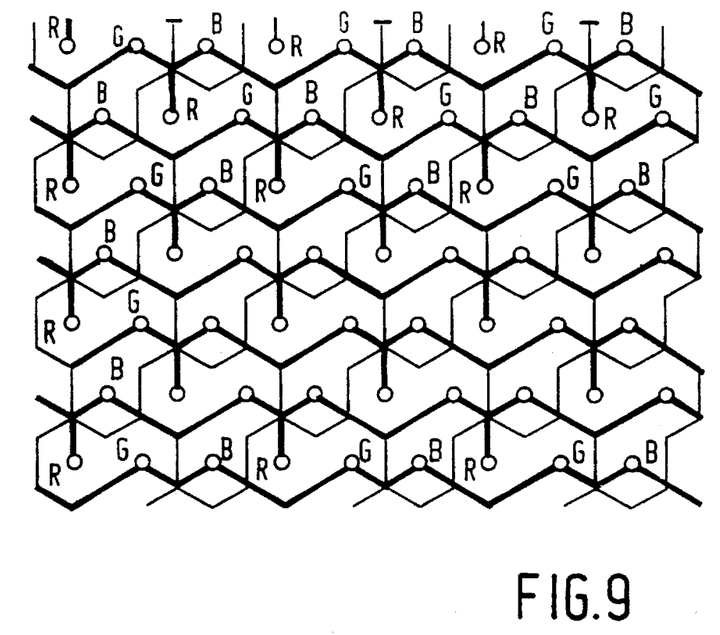
Figure 10:
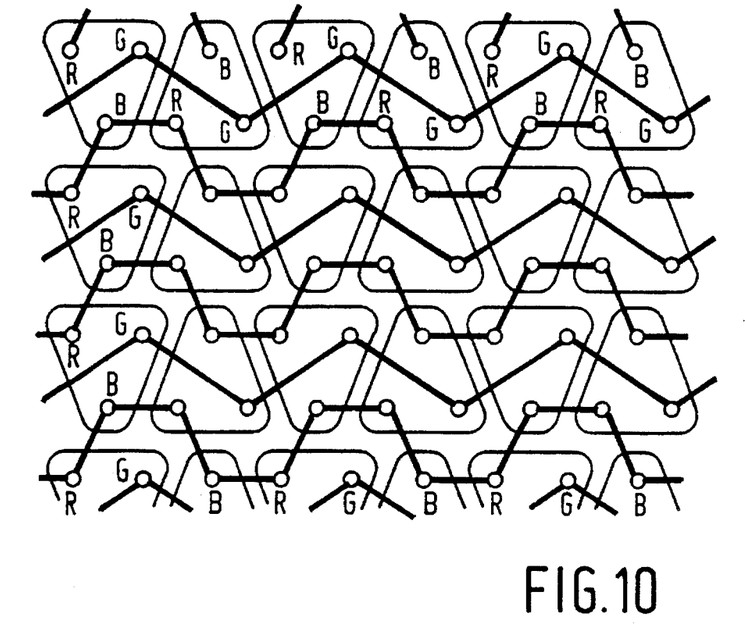
Figure 11:
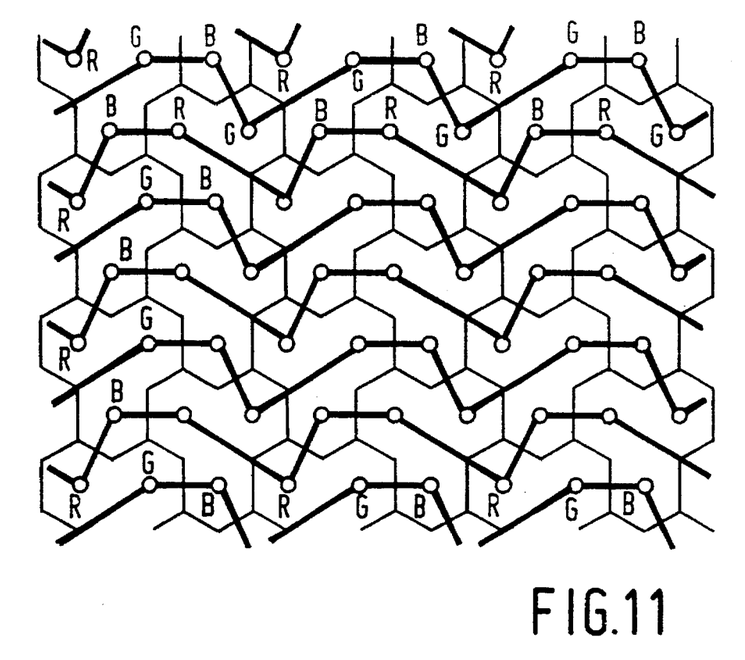
Figure 12:
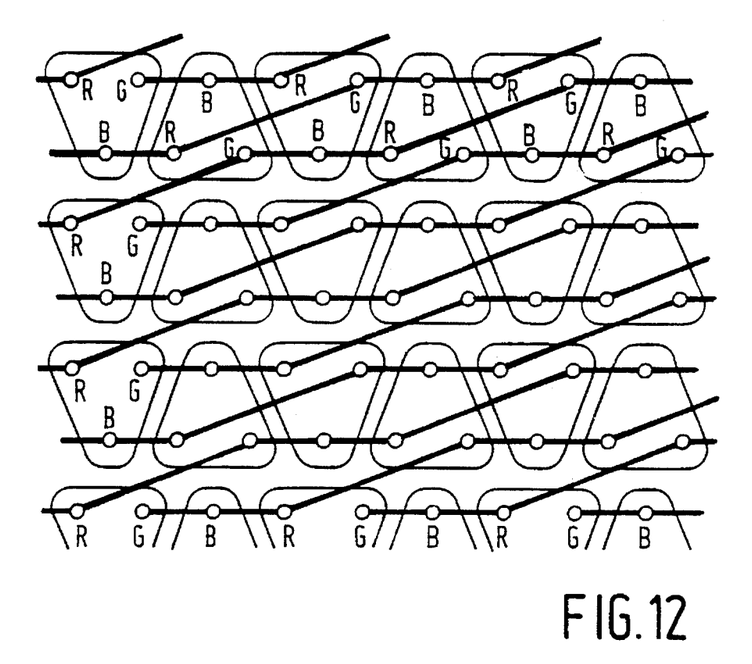
Figure 13:
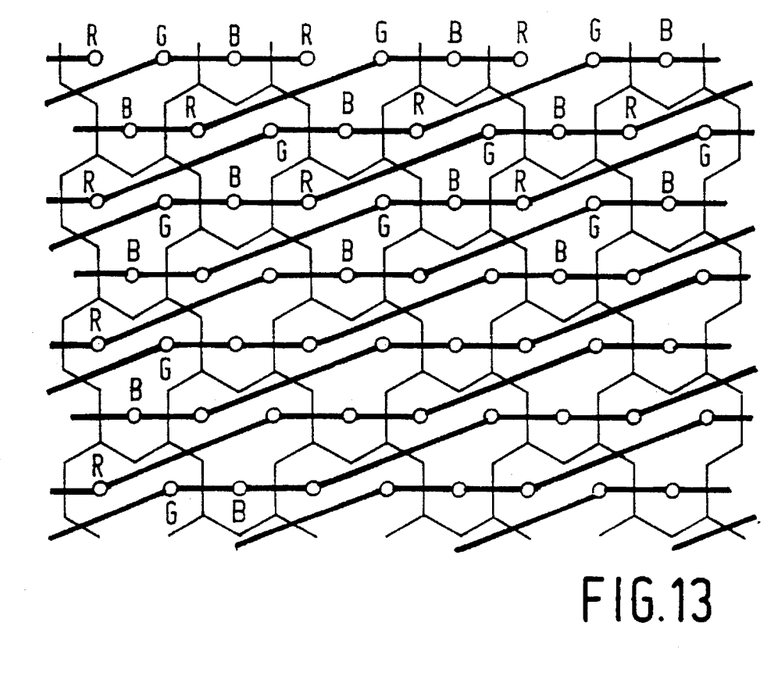

There are all kinds of possibilities. For the display effect it is advantageous to arrange the fine-selection apertures associated with each preselection aperture on the corners of a tri-angle (symmetry between the 3 apertures). The recognition that a track can interconnect different colours leads to a series of novel possibilities. A basic embodiment is, for example a track through the centre of each triangle with which one of the apertures is driven, while the remaining two apertures are driven by a superjacent and a subjacent track, respectively. The central track may give rise to negative charge during switch-off, but since the access aperture in the anti-direct hit plate is located right opposite this track, this has no serious consequences for addressing the other two apertures. FIGS. 8 to 11 show various embodiments using horizontally R, G, B colour dots. Here, simple horizontal tracks between identical colours are not possible and it is essential to connect dissimilar colours. In FIGS. 8 and 10 the triangles in the odd and the even columns are arranged at the same height and in FIGS. 9 and 11 the triangles in the even columns are located halfway the height of the triangles in the odd columns. This is attractive for the associated coarse selection. FIGS. 8, 9, 10 and 11 show examples of suitable "horizontally orientated" track patterns. FIGS. 12 and 13 show embodiments in which the track patterns are not oriented "horizontally" but "obliquely", using column arrangements of fine-selection triangles which are not staggered and which are staggered, respectively, with respect to each other.

Selection of the type 4:1 and higher:

In a hexagonal structure the drive symmetry is less satisfactory than in the case of selection of the type 3:1 or 2:1. Moreover, the location of the selection electrode tracks is favourable because there are now tracks which charge negatively, which may be caused during switch-off. This is an impediment to the route towards the outer apertures in a structure with horizontal R, G, B colour dot paths, a small distance between the tracks is necessary for a horizontal track pattern.

A multi-stage selection structure has been described hereinbefore in relation to two stages. However, the multi-stage selection structure can also be used to advantage with more than two stages.

It is to be noted that, in principle, the length of the electron propagation ducts or the quantity of juxtaposed propagation ducts is unimportant for the picture quality. Any aspect ratio for a display screen having a short axis and a long axis is thus possible, for example, 4:3; 14:9; 16:9. The electron propagation ducts are generally parallel to the short axis of the display screen, but in some cases it may be advantageous if they are parallel to the long axis.

The term "horizontal(ly)" is used in a large part of this description. This term is understood to mean parallel to the coarse-selection electrodes, but if the display is rotated a quarter turn, it will of course also work. There are of course also various trivial modifications of the patterns shown in the Figures, for example, patterns derived via mirroring etc.

We claim:

1. A display device comprising a luminescent screen having a pattern of pixels for luminescing in different colors and means for selectively energizing said pixels, said means comprising at least one electron transport duct having a plurality of exit apertures, means for promoting propagation of electrons within the at least one transport duct by secondary emission, and selection means for selectively extracting electrons from the exit apertures and directing said extracted electrons toward said pixels, said pixels being arranged along adjacent paths extending transversely to the at least one electron transport duct, the pixels in said adjacent paths being staggered with respect to each other.

2. A display device as in claim 1 where the selection means comprises:

a. a plurality of preselection electrodes, each including a number of portions disposed adjacent respective ones of the exit apertures;

b. a fine selection structure disposed between the preselection electrodes and the screen and having a multiplicity of groups of fine selection apertures, each of said apertures being in communication with a respective one of the pixels and each of the groups of apertures being in communication with a respective one of the exit apertures; and c. a plurality of fine selection electrodes, each including a number of portions disposed adjacent respective ones of the fine selection apertures.

3. A display device as in claim 2 where said portions of at least one of said fine selection electrodes are disposed adjacent ones of said fine selection apertures communicating with respective pixels luminescing in different colors.

4. A display device as in claim 2 where said portions of at least one of said fine selection electrodes are disposed adjacent ones of said fine selection apertures communicating with respective pixels luminescing in a common color.

5. A display device as in claim 2 where said portions of at least a first one of said fine selection electrodes are disposed adjacent ones of said fine selection apertures communicating with respective pixels luminescing in different colors and where said portions of at least a second one of said fine selection electrodes are disposed adjacent ones of said fine selection apertures communicating with respective pixels luminescing in a common color.

6. A display device as in claim 2 where each exit aperture communicates with first and second fine selection apertures adjacent which respective portions of different ones of the fine selection electrodes are disposed.

7. A display device as in claim 2 where each of the groups of fine selection apertures has three of said apertures adjacent which respective portions of different ones of the fine selection electrodes are disposed.

8. A display device as in claim 2 including an anti-hit structure disposed between the exit apertures and the fine selection apertures and including a multiplicity of apertures through which each group of apertures communicates with the respective exit aperture, the apertures in the anti-hit structure being arranged such that no direct-line paths exist between the exit apertures and the respective groups of fine selection apertures.

9. A display device comprising a luminescent screen having a pattern of pixels for luminescing in different colors and means for selectively energizing said pixels, said means comprising:

a. an arrangement of electron transport ducts, each having a plurality of exit apertures;
   b. means for promoting propagation of electrons within the ducts by recurrent electron interactions with secondary emission material; and
   c. selection means for selectively extracting electrons from the exit apertures and directing said extracted electrons toward said pixels, said selection means including an apertured selection plate of insulating material bearing electrodes arranged in a predefined pattern on a side of the plate facing the screen;

said pixels being arranged along adjacent paths extending transversely to the arrangement of electron transport ducts, the pixels in said adjacent paths being staggered with respect to each other.

10. A display device as in claim 9 where the selection means comprises:

a. a plurality of preselection electrodes, each including a number of portions disposed adjacent respective ones of the exit apertures;
   b. a fine selection structure disposed between the preselection electrodes and the screen and having a multiplicity of groups of fine selection apertures, each of said apertures being in communication with a respective one of the pixels and each of the groups of apertures being in communication with a respective one of the exit apertures; and
   c. a plurality of fine selection electrodes, each including a number of portions disposed adjacent respective ones of the fine selection apertures.

11. A display device as in claim 10 where said portions of at least one of said fine selection electrodes are disposed adjacent ones of said fine selection apertures communicating with respective pixels luminescing in different colors.

12. A display device as in claim 10 where said portions of at least one of said fine selection electrodes are disposed adjacent ones of said fine selection apertures communicating with respective pixels luminescing in a common color.

13. A display device as in claim 10 where said portions of at least a first one of said fine selection electrodes are disposed adjacent ones of said fine selection apertures communicating with respective pixels luminescing in different colors and where said portions of at least a second one of said fine selection electrodes are disposed adjacent ones of said fine selection apertures communicating with respective pixels luminescing in a common color.

14. A display device as in claim 10 where each exit aperture communicates with first and second fine selection apertures adjacent which respective portions of different ones of the fine selection electrodes are disposed.

15. A display device as in claim 10 where each of the groups of fine selection apertures has three of said apertures adjacent which respective portions of different ones of the fine selection electrodes are disposed.

16. A display device as in claim 10 including an anti-hit structure disposed between the exit apertures and the fine selection apertures and including a multiplicity of apertures through which each group of fine selection apertures communicates with the respective exit aperture, the apertures in the anti-hit structure being arranged such that no direct-line paths exist between the exit apertures and the respective groups of fine selection apertures.

17. A display device comprising a vacuum-tight enclosure including a face plate supporting a luminescent screen having a pattern of pixels for luminescing in different colors, a plurality of juxtaposed electron propagation ducts including means for promoting electron propagation by secondary emission, each duct having a wall with exit apertures extending substantially parallel to the face plate, and an addressing system for selectively extracting electrons from the exit apertures and directing said extracted electrons toward said pixels, said pixels being arranged along adjacent paths extending transversely to the juxtaposed electron propagation ducts, the pixels in said adjacent paths being staggered with respect to each other.

18. A display device as in claim 17 where the addressing system comprises:

a. a plurality of preselection electrodes, each including a number of portions disposed adjacent respective ones of the exit apertures;
   b. a fine selection structure disposed between the preselection electrodes and the screen and having a multiplicity of groups of fine selection apertures, each of said apertures being in communication with a respective one of the pixels and each of the groups of apertures being in communication with a respective one of the exit apertures; and
   c. a plurality of fine selection electrodes, each including a number of portions disposed adjacent respective ones of the fine selection apertures.

19. A display device as in claim 18 where said portions of at least one of said fine selection electrodes are disposed adjacent ones of said fine selection apertures communicating with respective pixels luminescing in different colors.

20. A display device as in claim 18 where said portions of at least one of said fine selection electrodes are disposed adjacent ones of said fine selection apertures communicating with respective pixels luminescing in a common color.

21. A display device as in claim 18 where said portions of at least a first one of said fine selection electrodes are disposed adjacent ones of said fine selection apertures communicating with respective pixels luminescing in different colors and where said portions of at least a second one of said fine selection electrodes are disposed adjacent ones of said fine selection apertures communicating with respective pixels luminescing in a common color.

22. A display device as in claim 18 where each exit aperture communicates with first and second fine selection apertures adjacent which respective portions of different ones of the fine selection electrodes are disposed.

23. A display device as in claim 18 where each of the groups of fine selection apertures has three of said apertures adjacent which respective portions of different ones of the fine selection electrodes are disposed.

24. A display device as in claim 18 including an anti-hit structure disposed between the exit apertures and the fine selection apertures and including a multiplicity of apertures through which each group of fine selection apertures communicates with the respective exit aperture, the apertures in the anti-hit structure being arranged such that no direct-line paths exist between the exit apertures and the respective groups of fine selection apertures.

* * * * *